United States Patent
Lisewski et al.

(10) Patent No.: US 10,306,423 B2
(45) Date of Patent: May 28, 2019

(54) DYNAMIC CONTENT CHECK INTERVAL FOR MULTICAST DEVICES

(71) Applicant: Verizon Patent and Licensing Inc., Arlington, VA (US)

(72) Inventors: Kevin Lisewski, Mahwah, NJ (US); Arvind K. Basra, Glen Ridge, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 251 days.

(21) Appl. No.: 15/145,644

(22) Filed: May 3, 2016

(65) Prior Publication Data

US 2017/0324836 A1    Nov. 9, 2017

(51) Int. Cl.
| | | |
|---|---|---|
| *G06F 15/16* | (2006.01) | |
| *H04W 4/06* | (2009.01) | |
| *H04B 1/3822* | (2015.01) | |
| *H04L 29/08* | (2006.01) | |
| *H04L 29/06* | (2006.01) | |

(52) U.S. Cl.
CPC .......... *H04W 4/06* (2013.01); *H04B 1/3822* (2013.01); *H04L 67/325* (2013.01); *H04L 69/28* (2013.01)

(58) Field of Classification Search
CPC ....... H04L 67/327; H04B 1/3822; H04W 4/06
USPC ........................................................ 709/217
See application file for complete search history.

(56) References Cited

U.S. PATENT DOCUMENTS

| | | | |
|---|---|---|---|
| 6,898,517 B1* | 5/2005 | Froeberg | G01C 21/26 340/691.6 |
| 2005/0256616 A1* | 11/2005 | Rhoads | H04L 67/06 701/1 |
| 2008/0177994 A1* | 7/2008 | Mayer | G06F 9/4418 713/2 |
| 2014/0269482 A1* | 9/2014 | Pandey | H04W 4/06 370/312 |
| 2016/0191258 A1* | 6/2016 | Oyman | H04L 12/189 370/312 |
| 2017/0048111 A1* | 2/2017 | Kodaypak | H04L 41/12 |
| 2017/0217390 A1* | 8/2017 | Curtis | B60R 16/033 |

* cited by examiner

*Primary Examiner* — Sm A Rahman

(57) ABSTRACT

A user equipment (UE) may periodically check for multicast updates from a wireless telecommunications network based on a particular interval (e.g., a "content check interval"). For example, when the UE is powered on, the UE may periodically check for multicast updates based on a default content check interval. The UE may monitor internal and/or external conditions, such as a status of an external device (e.g., a vehicle, an electronic billboard, etc.), a power source of the UE (e.g., an electrical outlet, a battery, etc.), a mode of operation of the UE (e.g., a sleep mode, an active mode, etc.), and an activity level of the UE (e.g., an level of processor activity, an amount of memory being used, etc.). The UE may determine a new content check interval based on the monitored conditions, and the UE may check for multicast updates based on the new content check interval.

20 Claims, 8 Drawing Sheets

DYNAMIC CONTENT CHECK INTERVAL FOR MULTICAST DEVICES

BACKGROUND

Wireless telecommunication networks often include user equipment (UE) capable of receiving media content (e.g., images, videos, movies, etc.) via multicast transmissions from the network. Traditionally, a UE may include a user device, such as a smartphone, a tablet computer, a laptop computer, etc. However, a UE may also include, or be part of, another type of device that is also capable of receiving media content via multicast transmissions. Examples of such devices may include digital signs (electronic billboards, electronic traffic signs, etc.), vehicle communication devices, kiosk terminals, etc.

In order to receive multicast content, a UE may check for new multicast content that is available via the wireless telecommunications network. The UE may check for new multicast content on an interval (referred to herein as a "content check interval") that defines how often the UE communicates with the network to determine whether multicast content updates are available. An example of a multicast update may include an updated content schedule (e.g., a schedule that describes when the network will multicast content), which may correspond to a present multicast frequency. The content check interval may be stored in a configuration file within a local memory of the UE.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1:
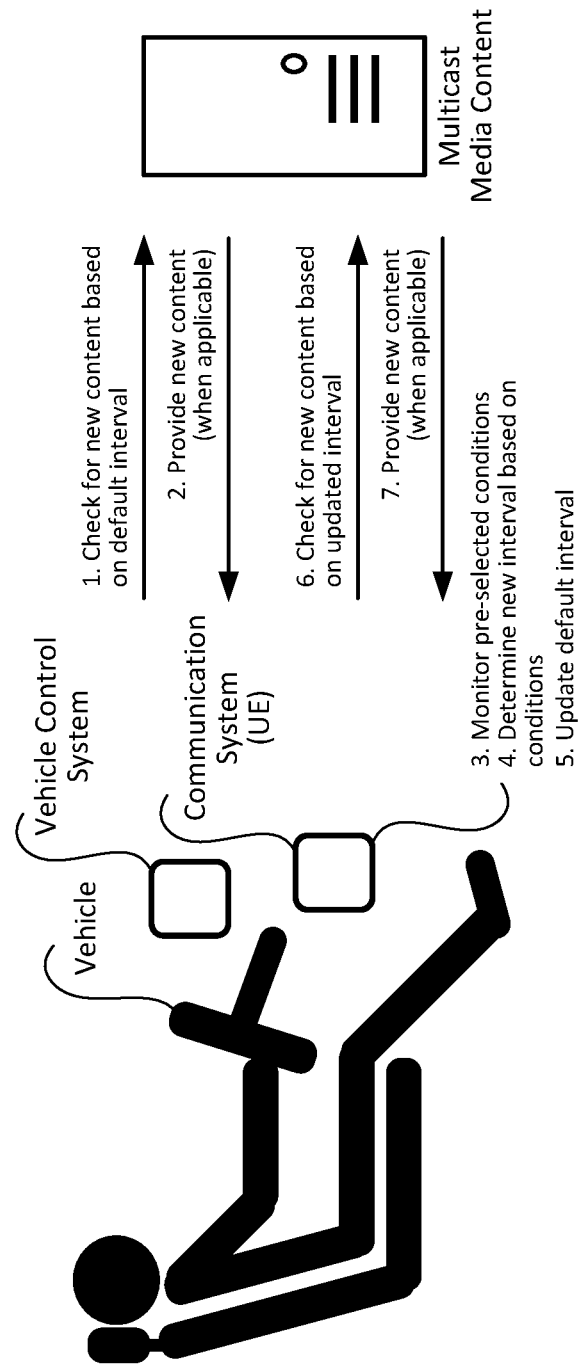
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Techniques described herein may be used to enable a user equipment (UE) to check for multicast content updates based on a dynamically determined interval (referred to herein as a "content check interval"). The UE may include a user device (e.g., a smartphone, a tablet computer, etc.). However, the UE may also be another type of wireless device that is capable of receiving multicast content from a wireless telecommunications network. An example of such a device may include a wireless communications component installed in a vehicle, a digital billboard, or another type of device.

When the UE is initially powered on, the UE may begin checking for multimedia updates based on a default content check interval (e.g., every 5 minutes, 10 minutes, etc.). The UE may monitor one or more internal or external conditions, such as a status of an external device (e.g., whether a vehicle, an electronic sign, etc., is on or off), an active power source (e.g., whether the UE is powered by an electrical outlet, a battery, etc.), a mode of operation of the UE (e.g., a sleep mode, an active mode, etc.), an internal activity level (e.g., a level of processor activity, an amount of temporary memory being used, etc.), and/or one or more other internal or external conditions. The UE may determine a new content check interval based on the monitored conditions, and may use the new content check interval to determine when the UE should check for multicast content updates. Doing so may, for example, enable the UE to check for multicast updates at a rate that is germane to the internal external conditions of the UE (e.g., that may help maximize the life of the current power source of UE, etc.).

For example, if the UE is using a temporary power source (such as an internal battery), the content check interval may be increased. Doing so may extend the life of the battery by reducing the frequency with which the UE checks for multicast content updates. In contrast, if the UE is using a more permanent power source (such as being connected to an electrical outlet via a power cord), the content check interval may be decreased. Doing so may increase the UE's ability to detect multicast content updates in a timely manner without reducing the longevity of the power source being used by the UE. The techniques described herein may also be applicable to other systems and/or scenarios, such as those involving broadcast techniques (e.g., Multimedia Broadcast Multicast Service (MBMS), enhanced MBMS (eMBMS), etc.), in which the UE checks for content based on some interval.

FIG. 1 illustrates an example overview of an implementation described herein. As shown, a UE may begin checking for multimedia content updates based on a current value a content check interval stored by the UE (at 1). In some implementations, the content check interval may be a value that the UE stores by default or a value that the UE has most recently determined as appropriate (e.g., based on the techniques described herein). If/when multicast updates become available, the UE may receive notice of said updates and/or may receive the actual updates themselves (at 2).

The UE may monitor one or more pre-selected conditions corresponding to the UE (at 3), which may include conditions that are internal to the UE and/or conditions that are external to the UE. Examples of such conditions may include an internal power source being used by the UE (e.g., a battery level or remaining battery charge, an amount of power currently being consumed by the UE, and/or an amount of current being drawn from a battery of the UE), a mode of operation of the UE (e.g., whether the UE is in a sleep mode or an active mode), the presence of an external power source (e.g., a power cord connected to an electrical outlet), a status of a device to which the UE is connected or installed (e.g., whether a vehicle is on or off, whether a laptop computer is on or off, etc.), and more. As shown in the example of FIG. 1, the UE may be installed inside of a vehicle, and may communicate with a vehicle control system (or another type of sensor or computing system within the vehicle) to collect information about the vehicle.

The UE may determine an appropriate content check interval based on the monitored conditions (at 4) and may update the content check interval that is currently being used by the UE with the newly determined content check interval (at 5). In addition, the UE may check for multimedia content updates based on the updated content check interval (at 6), and if/when multicast updates become available, the UE may receive notice of said updates and/or may receive the actual updates themselves (at 7). As such, the content check interval may be determined and updated dynamically. For example, when the UE is connected to an external power source (e.g., is plugged into an electrical outlet via a power cord), the content check interval may be lesser (i.e., more frequent) than when the UE is relying solely on a battery or another type of a temporary power source. As another example, when a level of activity of the UE is high (e.g., the UE is downloading, processing, and/or storing significant amounts of information), the content check interval may be greater than (i.e., less frequent) than when the level of activity of the UE is low.

Figure 2A:
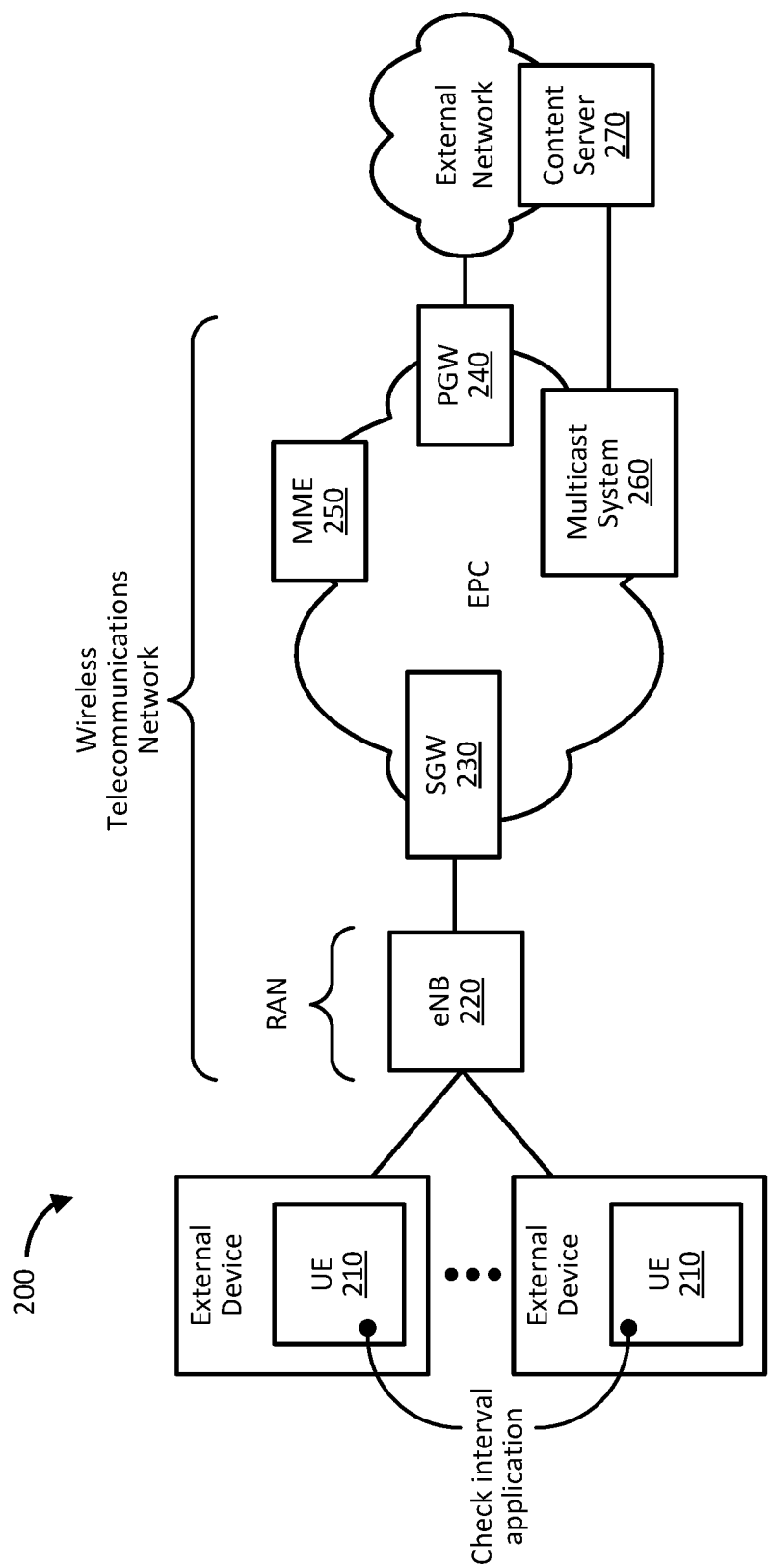
FIG. 2A illustrates an example environment in which systems and/or methods described herein may be implemented.

FIG. 2A is a diagram of an example environment 200 in which systems and/or methods described herein may be implemented. Environment 200 may include UEs 210, a wireless telecommunications network, an external network, and content server 280. The wireless telecommunications network may include an Evolved Packet System (EPS) that includes a Long-Term Evolution (LTE) network and/or an evolved packet core (EPC) network that operates based on a 3rd Generation Partnership Project (3GPP) wireless communication standard. The LTE network may be, or may include, radio access networks (RANs) that include one or more base stations, some or all of which may take the form of evolved Node Bs (eNBs) 220, via which UEs 210 may communicate with the EPC network.

The EPC network may include Serving Gateway (SGW) 230, packet data network (PDN) Gateway (PGW) 240, Mobility Management Entity (MME) 250, and multicast system 260. As shown, the EPC network may enable UEs 210 to communicate with an external network, such as a Public Land Mobile Network (PLMN), a Public Switched Telephone Network (PSTN), and/or an Internet Protocol (IP) network (e.g., the Internet). Additionally, the external network may include, or be connected to, content server 280.

The quantity of devices and/or networks, illustrated in FIG. 2A, is provided for explanatory purposes only. In practice, environment 200 may include additional devices and/or networks; fewer devices and/or networks; different devices and/or networks; or differently arranged devices and/or networks than illustrated in FIG. 2A. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environment 200. Additionally, the devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections may be shown between certain devices in FIG. 2A, some of said devices may, in practice, communicate with each other via one or more additional devices and/or networks.

UE 210 may include a portable computing and communication device, such as a personal digital assistant (PDA), a smart phone, a cellular phone, a laptop computer with connectivity to a cellular wireless network, a wearable device, a tablet computer, etc. UE 210 may sometimes be referred to, herein, as a "user device." UE 210 may also include a non-portable computing device, such as a desktop computer, a consumer or business appliance, or another device that has the ability to connect to telecommunications network 300. UE 210 may also include a computing and communication device that may be worn by a user (also referred to as a "wearable device") as a watch, a fitness band, a necklace, glasses, an eyeglass, a ring, a belt, a headset, or another type of wearable device. UE 210 may wirelessly communicate with telecommunications network 210 using eNB 220.

As shown, UE 210 may include a device, or component, of an external device (e.g., a vehicle, a kiosk terminal, a digital sign, or another type of system or device). In such scenarios, UE 210 may be capable of receiving multicast updates from the wireless telecommunications network. Additionally, UE 210, and/or the external device corresponding thereto, may provide the multicast updates to users, viewers, potential customers, etc., via a multimedia interface (e.g., screens, speakers, etc.). Additionally, or alternatively, the external device may use the content from the multicast transmissions in another way.

UE 210 may include a check interval application, which may enable UE 210 to dynamically modify an interval that defines how often UE 210 should check for multicast updates from the wireless telecommunications network (e.g., from multicast system 260). For example, the check interval application may enable UE 210 to monitor pre-selected conditions (e.g., a status of the external device, a remaining battery life of UE 210, a current processing capacity of UE 210, etc.). Additionally, UE 210 may determine an appropriate content check interval based on the monitored conditions and update the content check interval based on the newly determined content check interval. The check interval application, as described herein, may be implemented in one or more ways, and may include hardware, software, or a combination thereof. In some implementations, the check interval application may be a feature of an operating system installed on UE 210, while in other implementations, the check interval application may be a software application, or a feature of a software application, installed on UE 210.

eNB 220 may include one or more network devices that receive, process, and/or transmit traffic, such as calls, audio, video, text, television programming content, and/or other data, destined for and/or received from UE 210 (e.g., via an air interface). eNB 220 may be connected to a network device, such as site router, that functions as an intermediary for information communicated between eNB 220 and the EPC.

SGW 230 may aggregate traffic received from one or more eNBs 220 and may send the aggregated traffic to an external network or device via PGW 240. Additionally, SGW 230 may aggregate traffic received from one or more PGWs 240 and may send the aggregated traffic to one or more eNBs 220. SGW 230 may operate as an anchor for the user plane during inter-eNB handovers and as an anchor for mobility between different telecommunication networks. PGW 240 may include one or more network devices that may aggregate traffic received from one or more SGWs 230, and may send the aggregated traffic to an external network. PGW 240 may also, or alternatively, receive traffic from the external network and may send the traffic toward UE 210 (via SGW 230 and/or eNB 220).

MME 250 may include one or more computation and communication devices that act as a control node for eNB 220 and/or other devices that provide the air interface for the wireless telecommunications network. For example, MME 250 may perform operations to register UE 210 with the wireless telecommunications network, to establish bearer channels (e.g., traffic flows) associated with a session with UE 210, to hand off UE 210 to a different eNB, MME, or another network, and/or to perform other operations. MME 250 may perform policing operations on traffic destined for and/or received from UE 210.

Multicast system 260 may include one or more server devices, which may facilitate in the broadcasting of content to multiple UEs 210. In some implementations, multicast system 260 may broadcast programming content, provided by content server 270, via one or more eNBs 220. A more detailed example of multicast system 260, in accordance with some implementations, is described below with respect to FIG. 2B. In some implementations, multicast system 260 may implement an MBMS standard, an eMBMS standard, a Cell Broadcast Service ("CBS") standard (e.g., as standardized by the 3GPP), and/or another methodology of broadcasting messages or other content.

Content server 270 may provide content, such as programming content, to multicast system 260 for broadcast to UE 210. Content server 270 may be associated with a content provider, such as a television company, an on-demand movie company, and/or another distributor of content. The content may be, for example, programming content, such as television content, movie content, music content, and/or other types of content. The content may be encoded according to one or more codecs and/or encrypted according to one or more DRM techniques. In some implementations, content server 270 may include a set of encoders that encode the content according to the one or more codecs and/or encrypted the content according to the one or more DRM techniques. In some implementations, content server 270 may implement a Broadcast Video Provisioning Service ("BVPS"), which may initiate the transfer of content, including providing information regarding attributes of the content.

The devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2A between certain devices, some devices may communicate with each other via one or more additional devices and/or networks.

Figure 2B:
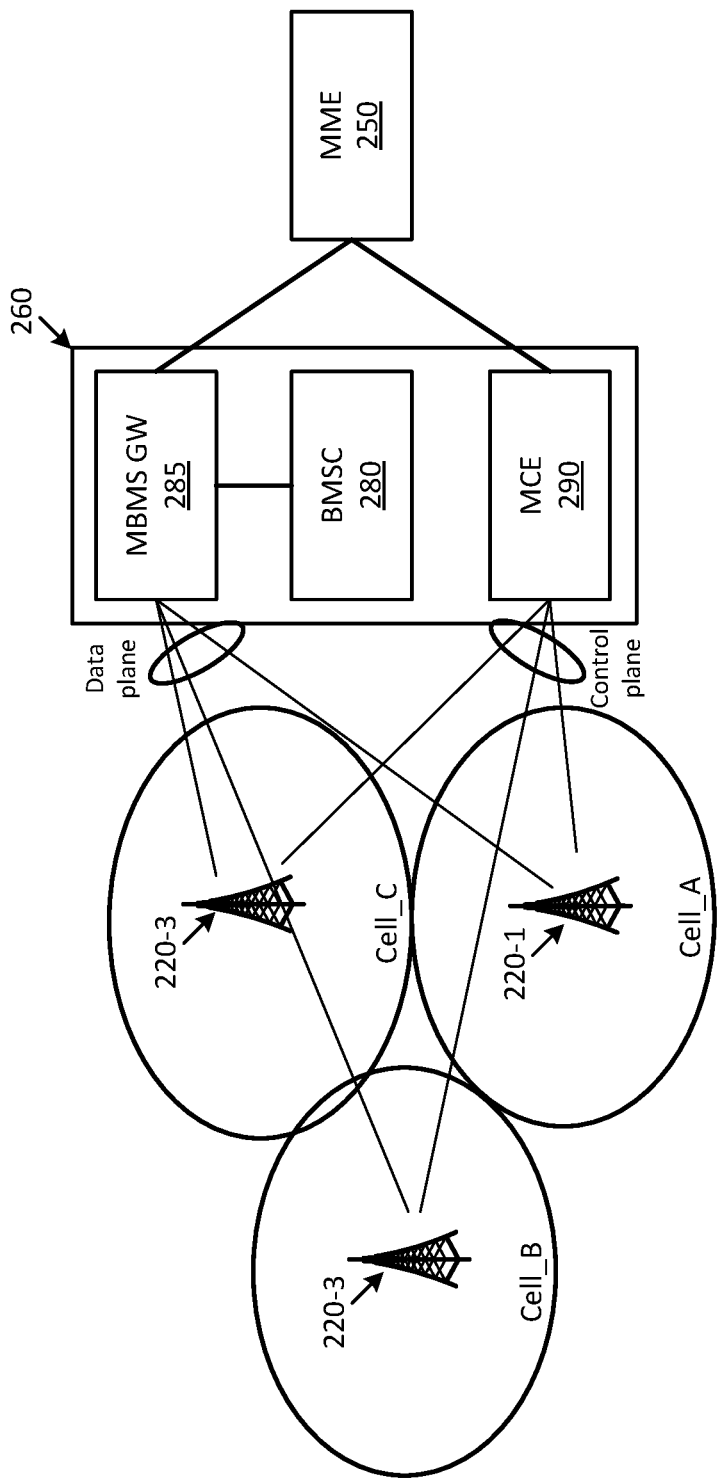
FIG. 2B illustrates an alternate view of some components of an environment in which systems and/or methods, described herein, may be implemented.

FIG. 2B illustrates some components of environment 200 in additional detail. As shown in FIG. 2B, multicast system 260 may include Broadcast Multicast Service Center ("BMSC") 280, MBMS Gateway ("MBMS GW") 285, and Multi-cell/multicast Coordination Entity ("MCE") 290. In the example shown in FIG. 2B, multicast system 260 may be in communication with base stations 220-1 through 220-3, each of which may be associated with a respective coverage area, or "cell" (shown in the figure as "Cell_A," "Cell_B," and "Cell_C").

BMSC 280 may include one or more computation or communication devices that provide for the coordination of broadcasting and/or multicasting using MBMS, eMBMS, CBS, and/or another broadcast technique. BMSC 280 may perform functions relating to authorization, charging, and assignment of communication channels. For example, BMSC 280 may assign a particular quantity of broadcast and/or multicast data channels for various content streams. BMSC 280 may also receive content (e.g., programming content from content server 270) for broadcast transmission and may forward the received content as part of a broadcast or a multicast transmission.

MBMS GW 285 may include one or more computation and communication devices that provide for the coordination of the sending of broadcast and/or multicast data (e.g., IP multicast packets) to base stations 220. MBMS GW 285 may receive the content, which is to be broadcasted and/or multicasted, from BMSC 280. As illustrated, MBMS GW 285 may transmit MBMS data plane traffic to base stations 220. For instance, MBMS GW 285 may forward content, received via the transport layer sessions, over one or more broadcast transport bearer channels (e.g., one or more MBMS bearer channels and/or one or more eMBMS bearer channels).

As mentioned above, MME 250 may perform policing operations on traffic destined for and/or received from UE 210. MME 250 may, in some implementations, aid in the control signaling necessary for messages to be broadcasted and/or multicasted to UEs 210 associated with base stations 220.

MCE 290 may include one or more computation and communication devices that may perform admission control, allocation of radio resources throughout a Multimedia Broadcast Multicast Service Single Frequency Network ("MBSFN") area, MBMS session control signaling, and make decisions on radio configurations. As illustrated, MCE 290 may transmit MBMS control plane traffic to base stations 220. In some implementations, MCE 290 may be involved in the establishment of a transport bearer channel (e.g., an MCH).

In eMBMS, cells associated with base stations 220 may be grouped to obtain MBSFN areas. Broadcast and/or multicast data channels in an MBSFN area may be synchronized so that identical broadcast and/or multicast radio signals may be generated, at the same time, for multiple cells. For example, MBSFN areas may be defined that cover the area associated with multiple ones of the illustrated cells. One example MBSFN area may correspond to the area covered by Cell_A and Cell_B. A broadcast and/or multicast data channel, transmitted in the MBSFN area, may include radio signals that are synchronized in Cell_A and Cell_B.

Examples described herein are described in implementations where content is broadcasted to UEs 210. That is, base stations 220 may broadcast content, via broadcast bearers, to UEs 210. In this manner, it is possible that all UEs 210, which are in communication with base stations 220, may receive the content broadcasted from base stations 220. In alternate implementations, one or more base stations 220 may multicast content to multiple UEs 210, without necessarily broadcasting the content to all UEs 210. In multicast implementations, multicast system 260 may provide information to base stations 220, indicating which multicast bearers should be associated with which UEs 210.

Figure 3:
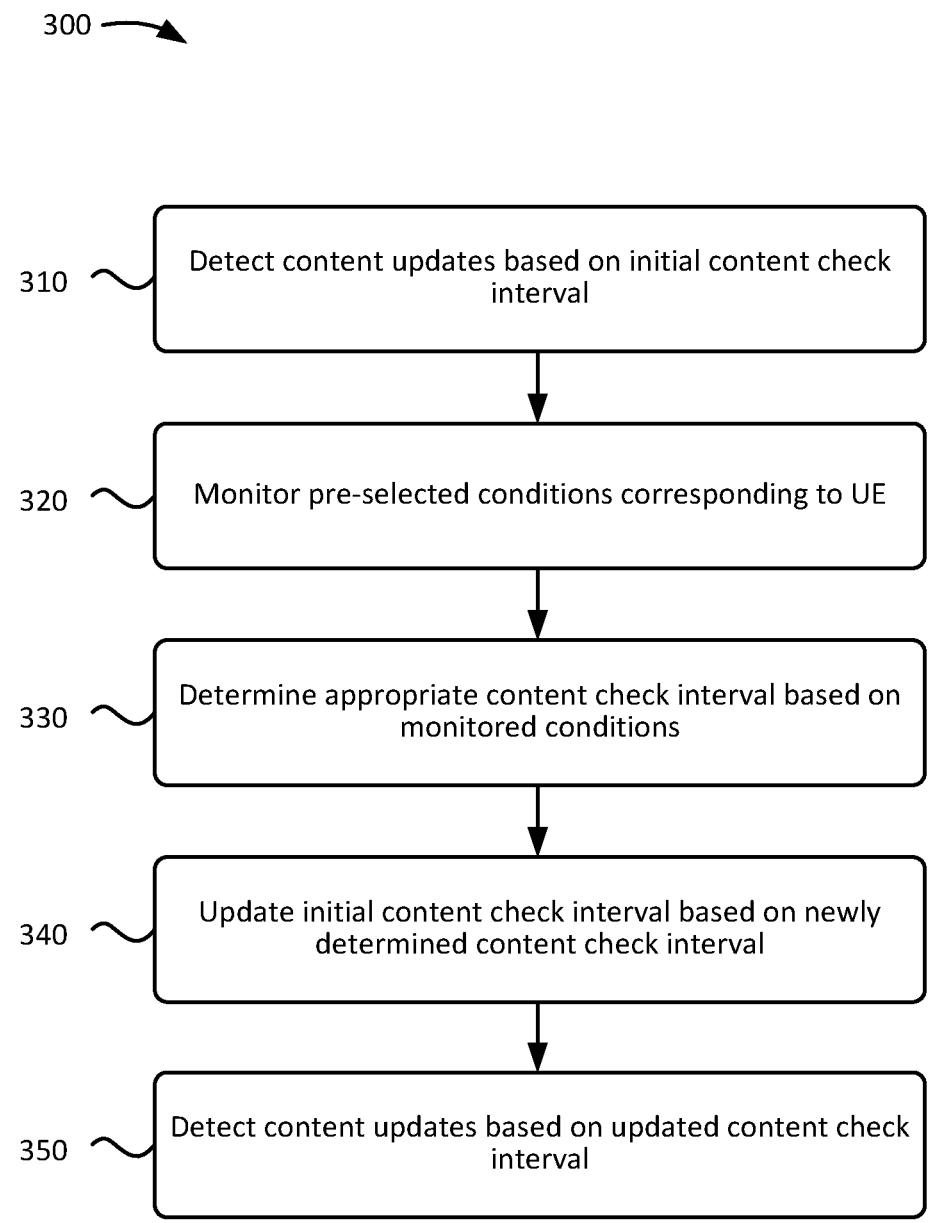
FIG. 3 illustrates an example process for dynamically updating a content check interval.

FIG. 3 is a flowchart diagram of an example process 300 for dynamically updating a content check interval. In some implementations, process 300 may be implemented by UE 210 (e.g., by the check interval application depicted in FIG. 2A).

As shown, process 300 may include detecting content updates based on an initial content check interval (block 310). For example, UE 210 may periodically or intermittently contact multicast system 260 and/or content server 280, in order to determine whether one or content updates have become available. In some implementations, the initial content check interval may be a default interval that UE 210 may use when another interval (e.g., a more appropriate interval) is not available. The initial, or default, content check interval may be stored by UE 210 in a local memory or another local data storage device. In some implementations, the content check interval may a value or variable that is stored in an eMBMS configuration file stored by UE 210.

Process 300 may include monitoring one or more preselected conditions corresponding to UE 210 (block 320). For example, UE 210 may collect information regarding one or more internal and/or external conditions. Examples of such information may include external device information, power source information, activity mode information, and internal activity information. A description and examples of each of these types of information is provided below with reference to FIG. 4.

Process 300 may also include determining an appropriate content check interval based on monitored conditions (block 330). For example, UE 210 may evaluate the information that is collected by monitoring the pre-selected conditions and producing an appropriate content check interval based on the analysis of the collected information. In some implementations, UE 210 may analyze the collected information and producing the appropriate content check interval (e.g., as discussed below with reference to FIG. 5).

Process 300 may include updating the initial content check interval based on the newly determined content check interval (block 340). For example, UE 210 may update the initial (or previous) content check interval with the appropriate content check interval. In some implementations (e.g., when the initial content check interval includes a default interval value), UE 210 may use the appropriate content check interval for determining when (e.g., how often) to contact the network for content updates. The appropriate (e.g., the most recently determined) content check interval may completely replace the initial content check interval (e.g., may replace the default content check interval, in the eMBMS configuration file, with the newly determined content check interval). In some implementations, UE 210 may also retain a copy of the initial (e.g., the default) content check interval, and return to using the initial content check interval if/when UE 210 is rebooted, restarted, etc.

Process 300 may include detecting content updates based on the updated content check interval (block 350). For example, UE 210 may periodically contact the network, based on the new content check interval, for multicast content updates. At some point, UE 210 may resume monitoring the pre-selected condition, determine a new (e.g., a more up-to-date) content check interval based on the monitored conditions, and use the new content check interval to determine when to contact the network and check for content updates. In some implementations, UE 210 may do so after the expiration of a pre-selected timer and/or in response to detecting a pre-selected trigger (e.g., an external device (e.g., a vehicle) turning on or off, UE 210 entering into a sleep mode, etc.).

Figure 4:
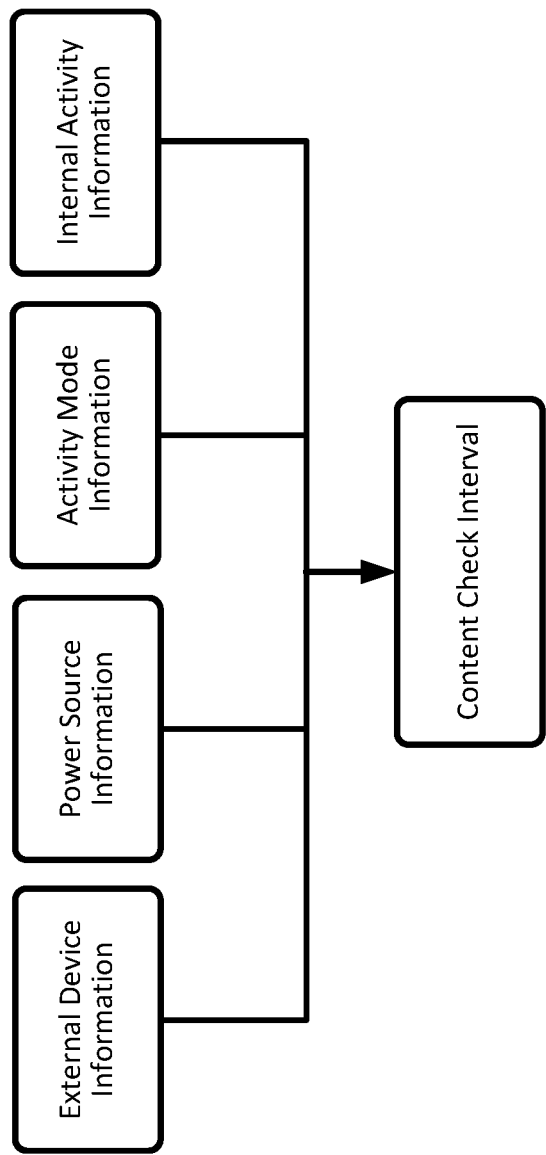
FIG. 4 illustrates an example implementation for dynamically updating a content check interval.

FIG. 4 is a logical flow diagram of an example implementation for an appropriate content check interval. In some implementations, the information and operations represented by the logical flow diagram of FIG. 4 may be implemented by UE 210 (e.g., by the check interval application depicted in FIG. 2A). As shown, UE 210 may collect and/or use several types of information when determining an appropriate content check interval. Examples of such information include external device information, power source information, activity mode information, and internal activity information. In some implementations, additional information, alternative information, or less information may be collected and/or used by UE 210 to determine an appropriate content check interval.

External device information may include information relating to one or more devices that are external to UE 210. For example, external device information may include a current operational state of an external device (e.g., a vehicle, a kiosk, a digital billboard, etc.). The operational state of the external device may include whether the external device is on or off, whether the external device is in a power saving mode (e.g., a sleep mode) or an active mode (e.g., in a state that consumes more power than the power saving or sleep mode), identifying a power source used by external device (e.g., whether the external device is powered by a battery, an AC power outlet, and/or a generator), etc.

Power source information may include information relating to a power source of UE 210. Examples of a power source of UE 210 may include a temporary power source (e.g., a battery) and an indefinite power source (e.g., an electrical outlet to which UE 210 is connected via a power cord). As another example, the power source may be determined in terms of whether the power source is a direct current (DC) power source or an alternating current (AC) power source. In some implementations, power source information may include information describing, or estimating, an amount of time that a temporary power source may last. The estimation may be based on one or more conditions that are monitored by UE 210, such as an amount of remaining power of the temporary power source and a current (and/or projected) level of activity of UE 210 (e.g., processor activities, memory activity, networking/communication activity, etc.).

Activity mode information may include information regarding a current operational mode of UE 210. For example, UE 210 may be capable of entering into an active mode, a power saving mode, and/or one or more other types of operational modes. An active mode may include a fully operational mode where UE 210 is receiving information from a user, communicating with a network, communicating with an external device, etc. A power saving mode may include a limited mode of operation where UE 210 is receiving, processing, and/or communicating a reduced or minimized amount of information. For example, when a screen of UE 210 is powered off, UE 210 may be in the power saving mode; while when the screen of UE 210 is powered on, UE 210 may be in the fully operational mode. In some implementations, UE 210 may enter the power saving mode in response to one or more conditions, such as UE 210 not receiving an input from a user for a pre-selected period of time, an explicit command from the user (e.g., a button press of a power button), etc.

Internal activity information may include information describing the level of activity of one or more internal components of UE 210. Examples of such internal components may include a processor, a memory, a user interface (e.g., a touch-sensitive screen), a network interface (e.g., a network interface card (NIC), an antenna, etc.), etc., of UE 210. For example, internal activity information may include information describing a current level of activity of a processor UE 210. As another example, internal activity information may include network activity information (e.g., an uplink and/or downlink throughput, such as number of bits per second) being sent and/or received by UE 210 via an antenna or another type of network interface of UE 210.

As shown in FIG. 4, UE 210 may determine an appropriate content check interval based on the pre-selected conditions that are monitored by UE 210. For instance, UE 210 may assign numeric values to monitored conditions (e.g., whether the UE 210 is on or off, whether a vehicle within which the UE 210 is installed is on or off, how much battery life is still available, the current level of activity of UE 210, etc.). These values may be used in order to produce the appropriate content check interval.

In some implementations, UE 210 may use predefined tables, indexes, and/or other tools to convert condition information (e.g., whether UE 210 is in an active mode or a sleep mode) into numeric values that may used in determining a content check interval. In some implementations, some of the information from the monitored conditions may be weighted more heavily that other information when determining the appropriate content check interval.

For example, when an external device is present, external device information (e.g., whether the external device is using a temporary or permanent power source) may be weighted more heavily than the internal activity information of UE 210 (e.g., a currently level of processor activity, a current level of memory usage, etc.). In another example, activity mode information (e.g., whether the UE 210 is in a power saving mode or an active mode) may be weighted more heavily when UE 210 is using a temporary power source (e.g., a battery of UE 210) than a more permanent power source (e.g., an AC outlet). In yet another example, one type of internal activity information may be weighted more heavily than other types of internal activity. For instance, a level of activity level of a relatively power-intensive component (e.g., an antenna of UE 210 sending radio signals) may be weighted more heavily than an activity level of a less power-intensive component (e.g., a memory component of UE 210).

Additionally, the significance of one condition may change based on the state of another condition. For example, an internal activity level (e.g., a current level of processor activity) may have a greater impact on the appropriate content check interval (e.g., a value that is based on the internal activity level may be weighted more heavily) when the active power source of UE 210 is a battery, but a lesser impact on the appropriate content check interval when the active power of UE 210 is an electrical outlet. In some implementations, the content check interval may be based on additional factors, fewer factors, and/or different factors than those presented in FIG. 4.

Figure 5:
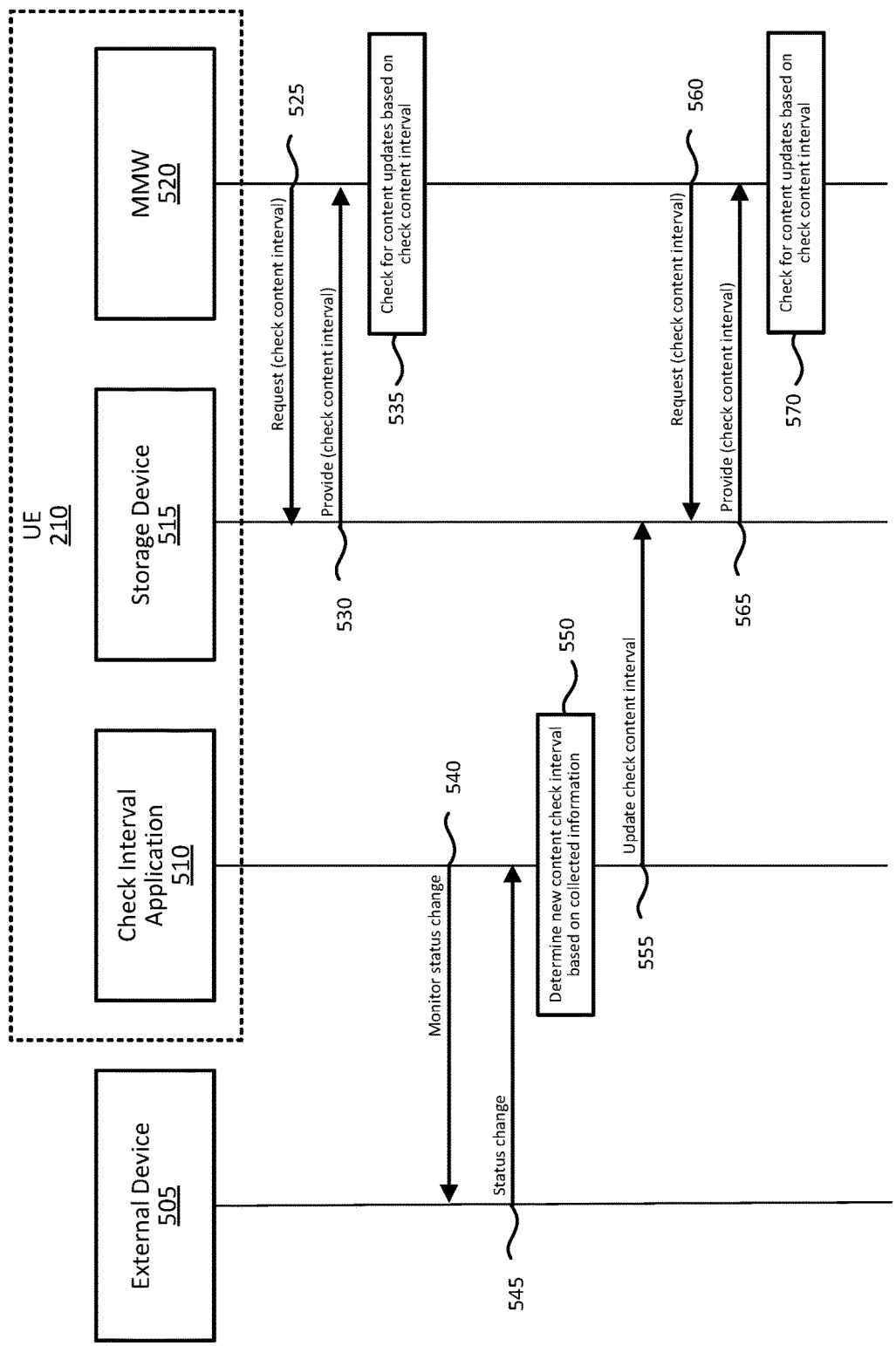
FIG. 5 illustrates an example process for dynamically updating a content check interval.

FIG. 5 is a sequence flow diagram of an example process for updating a content check interval. In some implementations, the process of FIG. 5 may be performed by UE 210, and may involve an external device 505 and components of UE 210 (e.g., check interval application 510, storage device 515, and multicast middleware (MMW) 520). External device 505 may include a system or device (e.g., a vehicle, a digital sign, a kiosk terminal, etc.) that includes, or is connected to, UE 210. Check interval application may include software installed on UE 210 and may enable UE 210 to perform one or more of the operations described herein (see, e.g., FIG. 3). Storage device 515 may include a local memory device that stores information. MMW 520 may include a software application, or a feature or utility thereof, in charge of checking for multicast updates based on the current check content interval.

As shown, MMW 520 may send a request to storage device 515 for the current check content interval (line 525), and storage device 515 may respond by providing the check content interval to MMW 520 (line 530). MMW 520 may begin using the content check interval to make periodic inquires to the network about whether any new or updated multicast content or information is available from the network (block 535).

Check interval application 510 may monitor one or more pre-selected conditions. Examples of such conditions are discussed above with reference to FIG. 4, and may include conditions relating external device 505 and/or conditions that are internal to UE 210. For example, external device 505 may include a vehicle, and UE 210 may be a component installed within, and/or connected to, the vehicle. Check interval application 510 may monitor the vehicle and collect information corresponding thereto (lines 540 and 545), such as whether the vehicle is on or off, whether the vehicle's engine is running, the amount of remaining battery life that the vehicle may have, etc. While not shown in FIG. 5, check interval application 510 may also monitor other conditions, such as whether UE 210 is using external device 505 (e.g., a battery of external device 505) as a power source, whether UE 210 is using an internal battery as a power source, a level of activity of a processor of UE 210, a level of activity of a network interface of UE 210, etc.

Check interval application 510 may use the collected information to determine a new check content interval (block 550). Check interval application 510 may provide the new check content interval to storage device 515 (line 550), and storage device 515 may store the new check content interval at a location within a file (or another data structure) so that the previous check content interval is updated by the new check content interval (line 555). In some implementations, for example, the new check content interval may be stored as a variable in an eMBMS configuration file.

At some point, MMW 520 may again send a request to storage device 515 for the current (e.g., the updated) check content interval (line 560), and storage device 515 may respond by providing the current check content interval to MMW 520 (line 565). MMW 520 may then begin using the updated content check interval to make periodic inquires to the network about whether any new multicast content or information is available (block 570).

Figure 6:
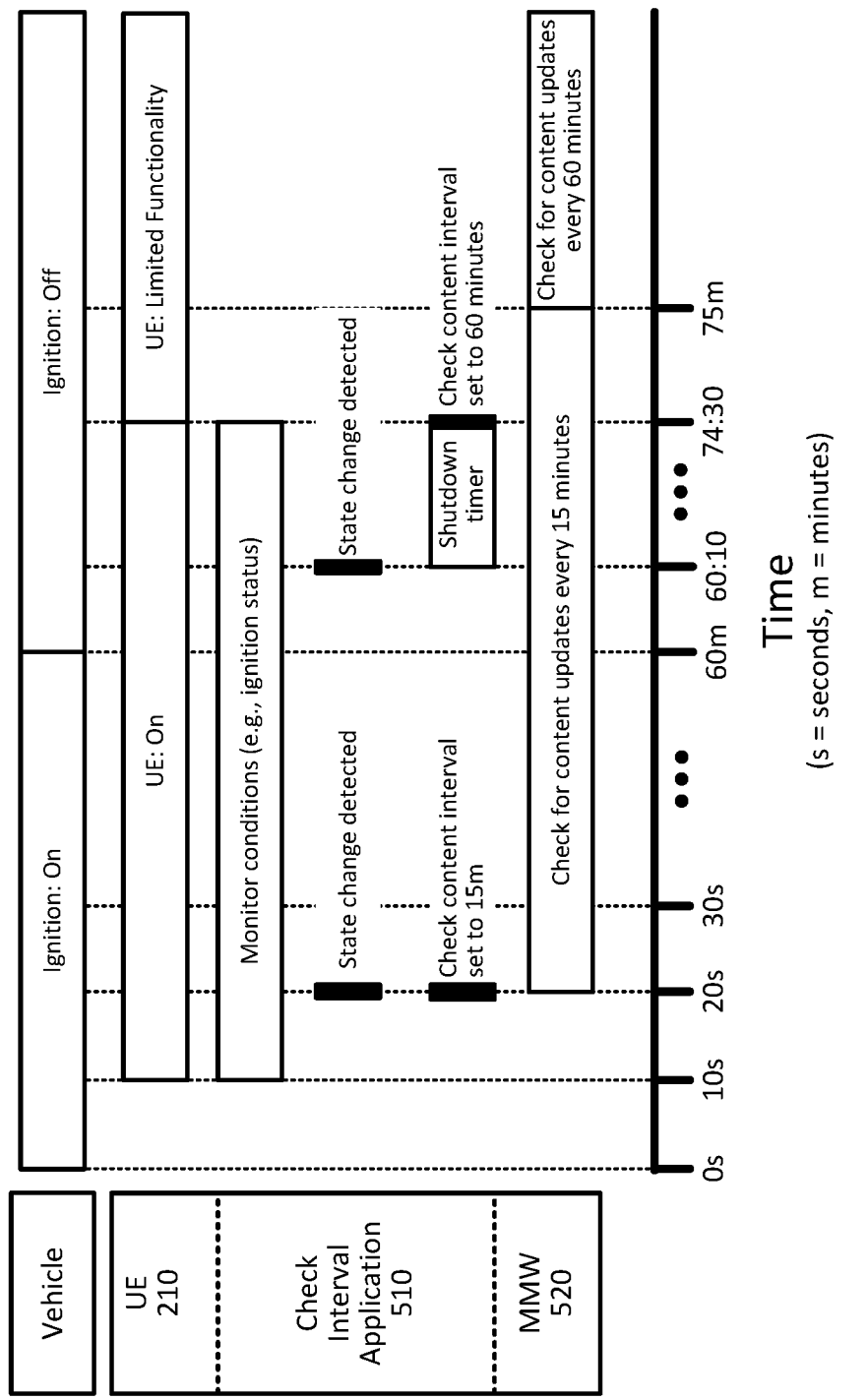
FIG. 6 illustrates an example implementation for dynamically updating a content check interval.

FIG. 6 conceptually illustrates an example of dynamically updating a check content interval. A timeline of events that relate to various devices is shown. As shown, the devices may include a vehicle to which UE 210 is connected (or installed), UE 210, and components of UE 210 (e.g., check interval application 510 and MMW 520). Additionally, while the example of FIG. 6 pertains to a scenario where UE 210 is connected to, or part of, a vehicle, one or more aspects of the example of FIG. 6 may be applicable to scenarios including one or more other types of external devices (or to no external device at all).

As shown, a driver of the vehicle may start the vehicle (Ignition: On) (at 0 seconds), which may cause UE 210 to turn on (e.g., UE: On) shortly thereafter (at 10 s). Turning UE 210 on may cause UE 210 to execute check interval application 510, and check interval application 510 may begin monitoring one or more internal or external conditions, such as the ignition status of the vehicle (at 10 s). By monitoring the ignition status, check interval application 510 may detect a state change (Ignition: On) regarding the vehicle (i.e., that the vehicle has been turned on). In FIG. 6, the state change is depicted as being depicted at 20 seconds instead of 10 seconds to, for example, account for the time that may be required to begin executing check interval application 510 and monitoring the ignition status. As a result, check interval application 510 may set the check content interval for UE 210 to 15 minutes (15 m). The check content interval may be set to 15 m (instead of another duration) for one or more reasons, such as a rule, implemented by check interval application 510, associating the ignition status of the vehicle (e.g., Ignition: On) with a duration for the check content interval (e.g., 15 m). As such, MMW 520 may begin contacting the network for content updates every 15 minutes.

As shown, the driver of the vehicle may at some point turn the vehicle off (Ignition: Off) (e.g., at 60 minutes). Despite, the vehicle being turned off, UE 210 may continue running based on an available power source, such as a battery of the vehicle and/or a battery of the UE itself. As such, check interval application 510 may continue monitoring conditions even after the vehicle is turned off. Additionally, shortly after the vehicle is turned off (e.g., at 60 minutes and 10 seconds (60:10)), check interval application 510 may detect that the vehicle has been turned off. In some implementations, the slight delay (e.g., 10 seconds) may, for example, result from the monitoring of the ignition state of the vehicle occurring on a periodic basis (e.g., every 10 seconds). In some implementations, there might not be a slight delay between the actual state change of the vehicle and check interval application 510 detecting the state change.

In response to detecting the state change, check interval application 510 may begin a shutdown timer. The shutdown timer may be a period of time that check interval application 510 is required to wait before updating the check content interval based on the newly detected state change (e.g., Ignition: Off). As such, the shutdown timer may be used to help ensure that the corresponding condition (e.g., the vehicle being turned off) will last for long enough to justify updating the check content interval. For example, the shutdown timer of FIG. 6 may be a period of time designated to help ensure that the driver of the vehicle intends to be away for a significant period of time (e.g., does not turn the vehicle back on shortly after turning the vehicle off). If the driver were to turn the vehicle back on before the shutdown timer expires, there would be no need to, for example, revert back to the check content interval of 15 minutes, since the check content interval still would not have been changed. As such, the shutdown time may provide a buffer for ensuring that a detected condition is likely to last long enough to justify updating the check content interval based on the newly detect condition.

As shown, after the shutdown time expires, UE 210 may change from a fully functional state (e.g., UE: On) to a state of limited functionality (e.g., UE: Limited Functionality). In a fully functional state, UE 210 may be capable of performing all of the operations described herein, such as receiving and/or providing multicast content, monitoring one or more conditions (e.g., state changes of the vehicle), updating the content check interval, checking the network for multicast content updates, etc. By contrast, while in a state of limited functionality, UE 210 may only be able to perform some of the operations described herein, such as updating the content check interval and checking for multicast content updates. The limited functionality state may be a "lower power" state (e.g., a state in which UE 210 consumes less power than when in the "On" state).

As shown, therefore, when the shutdown timer expires, check interval application 510 may discontinue monitoring the vehicle ignition status. However, check interval application 510 may change the check content interval from 15 minutes to 60 minutes. At the end of the remaining 15 minute interval (at about 75 minutes), MMW 520 may a begin checking the network for content updates based on the 60 minute content check interval. While not shown, at some point, the UE 210 may shut down and discontinue checking the network for content updates.

Figure 7:
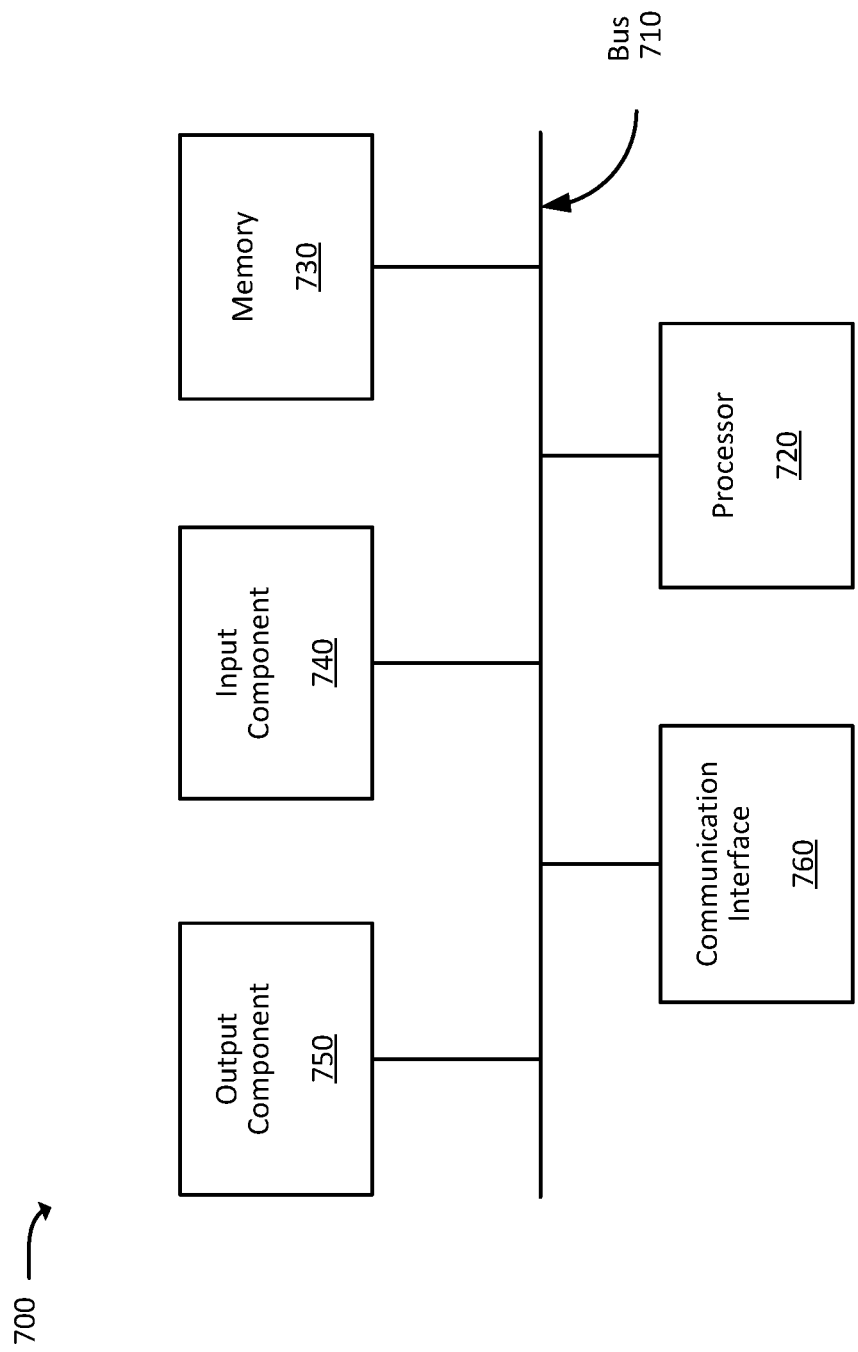
FIG. 7 illustrates a block diagram of example components of a device.

FIG. 7 is a diagram of example components of a device 700. Each of the devices illustrated in FIGS. 1, 2, and 5 may include one or more devices 700. Device 700 may include bus 710, processor 720, memory 730, input component 740, output component 750, and communication interface 760. In another implementation, device 700 may include additional, fewer, different, or differently arranged components. As described herein, a component may be implemented by hardware circuitry, software logic, and/or some combination thereof.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1, 3, 4, and 5 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user equipment (UE), comprising:
a non-transitory computer-readable medium storing a set of processor-executable instructions; and
one or more processors configured to execute the set of processor-executable instructions, wherein executing the set of processor-executable instructions causes the one or more processors to:
communicate, at a first time, with a wireless telecommunications network to check for updates to media content available via multicast transmission from the wireless telecommunications network;
communicate, at a second time that occurs after an expiration of a first content check interval after the first time, with the wireless telecommunications network to check for updates to media content available via multicast transmission from the wireless telecommunications network;
monitor one or more conditions relating to the UE, wherein the one or more conditions include at least one of:
an ignition status of a vehicle to which the UE is connected, or
whether the UE is in an active mode of operation or a power saving mode of operation;
determine a second content check interval based on the one or more conditions; and
communicate, at a third time that occurs after an expiration of the second content check interval after the second time, with the wireless telecommunications network to check for updates to media content available via multicast transmissions from the wireless telecommunications network.

2. The UE of claim 1, wherein the one or more conditions further include an identification of a power source that the UE is currently using.

3. The UE of claim 1, wherein the first content check interval includes a default interval that is available upon startup of the UE.

4. The UE of claim 3, wherein executing the set of processor-executable instructions further causes the one or more processors to:
revert back to using the first content check interval when the UE is rebooted.

5. The UE of claim 1, wherein the first content check interval and the second content check interval are determined based on an enhanced Multimedia Broadcast Multicast Service (eMBMS) file stored by the UE.

6. A non-transitory, computer readable medium storing a plurality of processor-executable instructions, wherein executing the processor-executable instructions causes one or more processors to:
communicate, at a first time, with a wireless telecommunications network to check for updates to media content available via multicast transmission from the wireless telecommunications network;
communicate, at a second time that occurs after an expiration of a first content check interval after the first time, with the wireless telecommunications network to check for updates to media content available via multicast transmission from the wireless telecommunications network;

monitor one or more conditions relating to user equipment (UE), wherein the one or more conditions include at least one of:
  an ignition status of a vehicle to which the UE is connected, or
  whether the UE is in an active mode of operation or a power saving mode of operation;
determine a second content check interval based on the one or more conditions; and
communicate, at a third time that occurs after an expiration of the second content check interval after the second time, with the wireless telecommunications network to check for updates to media content available via multicast transmissions from the wireless telecommunications network.

7. The non-transitory, computer readable medium of claim 6, wherein the one or more conditions further include an identification of a power source that the UE is currently using.

8. The non-transitory, computer readable medium of claim 6, wherein the first content check interval includes a default interval that is available upon startup of the UE.

9. The non-transitory, computer readable medium of claim 8, wherein the processor-executable instructions causes the one or more processors to:
  revert back to using the first content check interval when the UE is rebooted.

10. The non-transitory, computer readable medium of claim 6, wherein the first content check interval and the second content check interval are determined based on an enhanced Multimedia Broadcast Multicast Service (eMBMS) file stored by the UE.

11. A method, comprising:
  communicating, at a first time, with a wireless telecommunications network to check for updates to media content available via multicast transmission from the wireless telecommunications network:
  communicating, by a user equipment (UE) and at a second time that occurs after an expiration of a first content check interval after the first time, with the wireless telecommunications network to check for updates to media content available via multicast transmission from the wireless telecommunications network;
  monitoring, by the UE, one or more conditions relating to the UE, wherein the one or more conditions include at least one of:
    an ignition status of a vehicle to which the UE is connected, or
    whether the UE is in an active mode of operation or a power saving mode of operation;
  determining a second content check interval based on the one or more conditions; and
  communicating, by the UE and at a third time that occurs after an expiration of the second content check interval after the second time, with the wireless telecommunications network to check for updates to media content available via multicast transmissions from the wireless telecommunications network.

12. The method of claim 11, wherein the one or more conditions further include an identification of a power source that the UE is currently using.

13. The method of claim 11, further comprising:
  reverting back to using the first content check interval when the UE is rebooted.

14. The method of claim 11, further comprising determining the first content check interval and the second content check interval based on an enhanced Multimedia Broadcast Multicast Service (eMBMS) file stored by the UE.

15. The method of claim 11, wherein the first content check interval includes a default interval that is available upon startup of the UE.

16. The method of claim 11, wherein the one or more conditions further include a level of processor activity of the UE.

17. The method of claim 11, wherein the one or more conditions further include a level of memory usage of the UE.

18. The UE of claim 1, wherein the one or more conditions further include a level of processor activity of the UE.

19. The UE of claim 1, wherein the one or more conditions further include a level of memory usage of the UE.

20. The non-transitory computer-readable medium of claim 6, wherein the one or more conditions further include at least one of:
  a level of processor activity of the UE, or
  a level of memory usage of the UE.

* * * * *